United States Patent [19]
Moseman, Jr.

[11] 3,868,843
[45] Mar. 4, 1975

[54] METHOD OF ANALYZING ANGULAR MOTION OF A POINTER OF AN ALTIMETER

[75] Inventor: Paul W. Moseman, Jr., Davenport, Iowa

[73] Assignee: The Bendix Corporation, South Bend, Ind.

[22] Filed: Apr. 23, 1973

[21] Appl. No.: 353,827

[52] U.S. Cl. .................................. 73/1 R, 73/4 R
[51] Int. Cl. .......................................... G01l 27/02
[58] Field of Search ........ 73/1 R, 4 R; 340/258, 212

[56] References Cited
UNITED STATES PATENTS

| | | | |
|---|---|---|---|
| 2,538,065 | 1/1951 | Wallace | 340/212 |
| 2,680,241 | 6/1954 | Gridley | 340/212 |
| 2,709,802 | 5/1955 | McClure | 73/1 R |
| 3,001,131 | 9/1961 | Oliver | 73/1 R |
| 3,626,748 | 12/1971 | Springer | 73/4 R |

Primary Examiner—S. Clement Swisher
Attorney, Agent, or Firm—Leo H. McCormick, Jr.; William N. Antonia

[57] ABSTRACT

A method of analyzing the angular displacement of a pointer of an altimeter in response to an input signal by recording and evaluating the time interval for interception of the pointer by a circular trace. The time interval will produce an output signal which is compared with a master signal to determine if a variance exists therebetween. Any discovered variance is transmitted to a display to inform an operator that a correction is required before the indicator can accurately transmit the input signal to the pointer.

9 Claims, 6 Drawing Figures

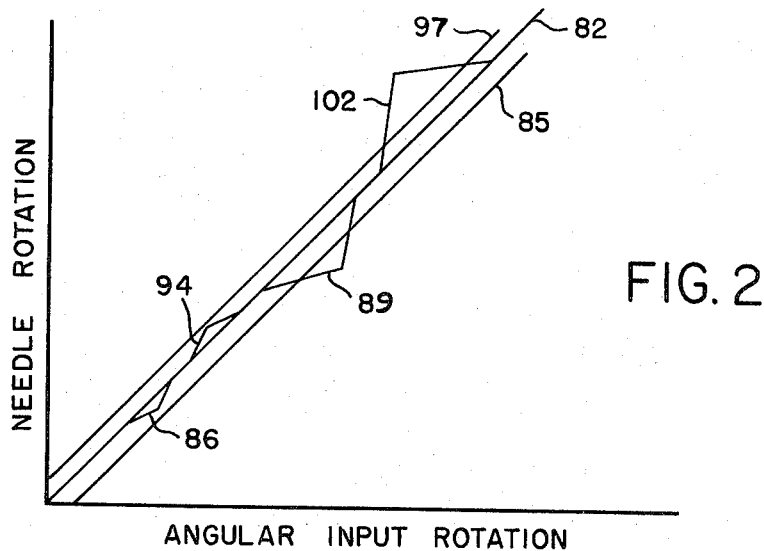
FIG. 2
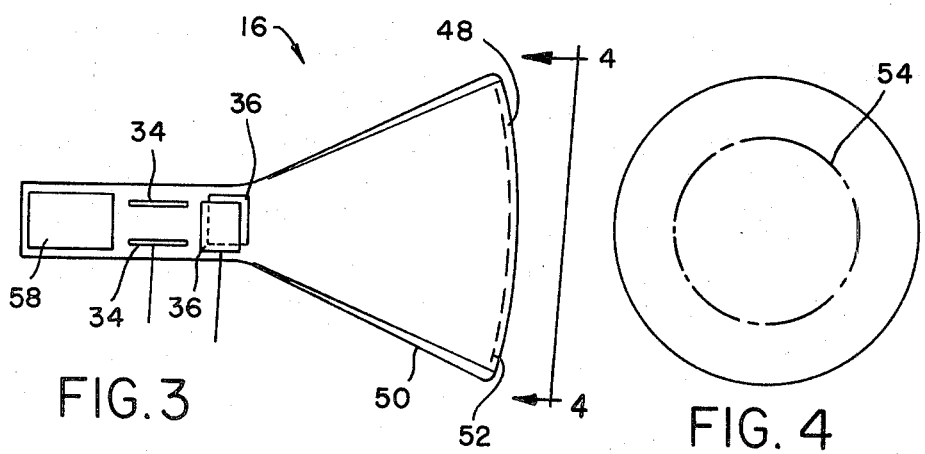
FIG. 3
FIG. 4
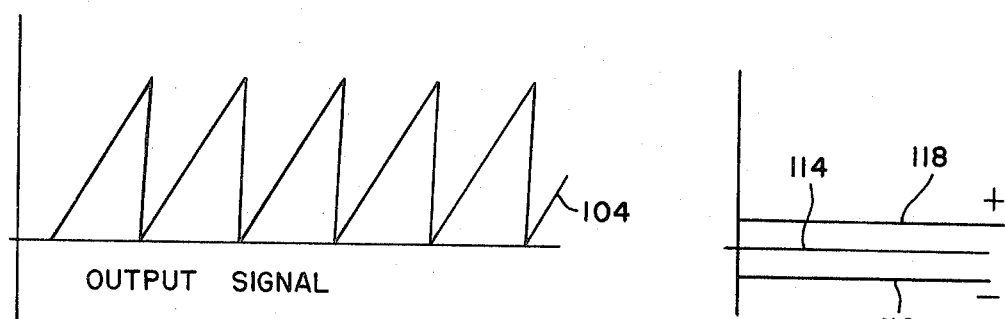
FIG. 5
FIG. 6

METHOD OF ANALYZING ANGULAR MOTION OF A POINTER OF AN ALTIMETER

BACKGROUND OF THE INVENTION

In manufacturing altimeters the final calibration must result in an instrument capable of measuring the altitude of an aircraft to within ± 1 percent up to 20,000 feet under varying barometric conditions. Aircraft utilizing IFR which fly in an easterly direction are required to fly at odd number elevations of 1,000 ft. whereas such aircraft which fly in a westerly direction are required to fly at even number elevations of 1,000 ft. However, aircraft utilizing VFR are required to fly at elevations 500 ft. above the odd or even elevations required for IFR flights. It can be readily appreciated that if one aircraft is flying on IFR and another aircraft on VFR, the 1 percent limitation of accuracy on altimeters would be the maximum safety differential which will assure that a collision would not occur.

The accuracy of an indicated altitude is usually evaluated at each 1,000 ft. elevation by simultaneously supplying an input to a master altimeter and the test altimeter. This input will move a pointer on the master altimeter to register and hold at selected elevations of 1,000 increments. The corresponding elevation on the test altimeter is recorded and checked against allowed limits. However, under certain conditions, the test altimeter will fall within these limits at the test points and yet vary more than the allowed ± 1 percent in-between the test points. Because of the time involved and the possibility for human error in recording, it is possible that an altimeter could receive approval during inspection whereas in reality it should be rejected. Such an altimeter would have been discovered if the point-to-point inspection of smaller increments could feasibly have been made so that stop-jump movement of the pointer could be ascertained.

SUMMARY OF THE INVENTION

I have devised a method and system wherein the pointer of an altimeter is scanned by a video camera during an inspection after final calibration to determine the accuracy of the altimeter with respect to a master altimeter. The video camera is modified to receive the output of a circular sweep generator to produce a circular scan of the face of the altimeter. An input signal representative of altitude is transmitted to the altimeter causing the pointer to rotate. The circular trace will intercept the pointer several thousand times per second to provide an indication of the response of the pointer to the input means. The interceptions are used to stop a counter means which was started at a scan zero reference and thereby the time interval between each is measured. The measured time interval is proportional to the angular position of the pointer, assuming the angular scan rate remains constant. Each of these time intervals is converted into an output signal and relayed to an analyzer. The analyzer will compare the output signal with a master signal to determine any variance therewith. If a variance is discovered, the effect upon the pointer position and uniformity of the angular displacement thereof is determined. Upon a detrimental effect being determined, a display is activated to inform an operator that a correction is required to bring the accuracy of the test altimeter within predetermined limits of the master altimeter.

It is therefore an object of this invention to provide a method of determining the accuracy of an altimeter with respect to a master altimeter.

It is another object of this invention to provide a system of analyzing the movement of a pointer of an altimeter by converting the time interval between a scan zero reference and the interception of the pointer by a circular trace into an output signal which is compared with a master signal to measure accuracy thereof.

It is still another object of this invention to provide a method of analyzing the movement of a rotatable indicator to determine the relationship between an input torque and output display.

These and other objects will be apparent from reading this specification and viewing the drawings.

BRIEF DESCRIPTION OF THE DRAWINGS

FIG. 2 is a graphic illustration of the relationship of an input signal to an output signal.

FIG. 3 is a sectional view of a video camera for use in the system shown in FIG. 1.

FIG. 4 is a view taken along line 4—4 of FIG. 3 showing a circular trace on the video camera.

FIG. 5 is a graph showing the output of an analog converter.

FIG. 6 is a typical display of an output on a scope.

DETAILED DESCRIPTION OF THE PREFERRED EMBODIMENT

Figure 1:
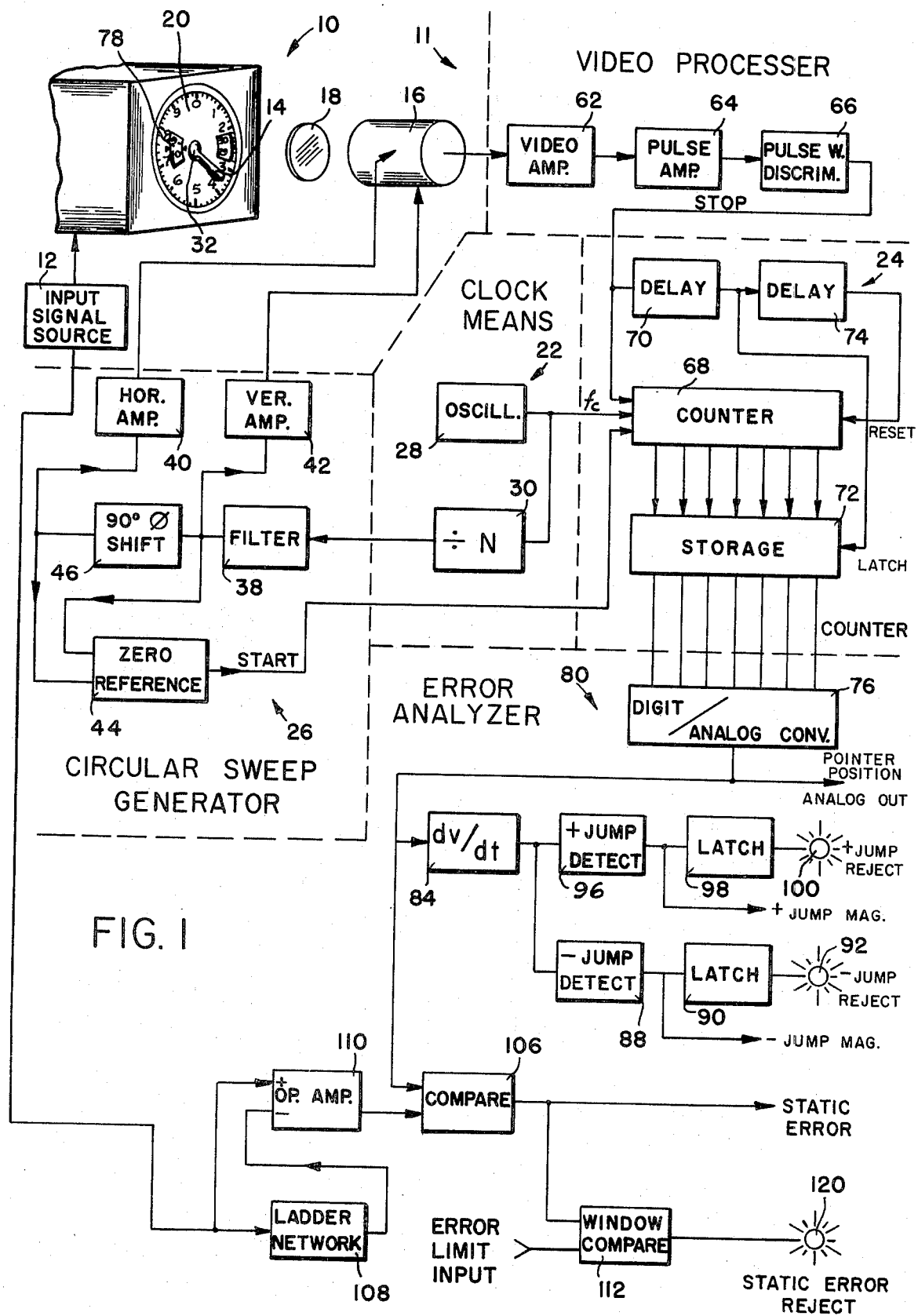
FIG. 1 is a schematic illustration of a system for analyzing the angular displacement of a pointer on an altimeter in response to an input signal through a video camera comparing means.

The indicator system, shown in FIG. 1, includes an altimeter 10, whose accuracy is to be compared, and a video comparator means 11. The altimeter receives an input signal from actuation control source 12. The input signal produces a torque on the drive train (not shown) in the altimeter 10 which will move pointer 14. The input signal will simulate changes in elevation of the altimeter 10. A camera means 16 of the video comparator means 11 is focused through lens 18 on to the face of dial 20 of the altimeter 10. A circular sweep generator means 26 will supply the video camera means 16 with an operational signal for scanning the dial 20. The scan rate of the video camera means 16 is an integral sub-multiple of an oscillator 28 in a clock means 22 as modified by a divider means 30 according to the following formula:

$$M = F_c/N$$

where:

$M$ = scans per second of time
$F_c$ = clock frequency
$N$ = divider ratio derived by a desired angular resolution in degrees = $360/N$ From experience I have determined that various clock means 22 may be used depending upon the desired measurements per time period. The following table is illustrative of some limits which will provide useful information with respect to scan rates.

TABLE 1

| Oscillator Freq. | Divider Ratio N | | | | | |
|---|---|---|---|---|---|---|
| | 100 | 200 | 500 | 1000 | 2000 | 5000 |
| 1 MHz | 10K | 5K | 2K | 1K | 0.5K | 0.25K |
| 2 MHz | 20K | 10K | 4K | 2K | 1.0K | 0.4K |
| 5 MHz | 50K | 25K | 10K | 5K | 2.5K | 1K |
| 10 MHz | 100K | 50K | 20K | 10K | 5K | 2K |
| 20 MHz | 200K | 100K | 40K | 20K | 10K | 4K |

The stair step leading down to the right is possibly the upper limit of useable information in an altimeter analyzer system. For example, an oscillator 28 having an operating frequency of 10 megahertz modified 1,000 times by divider 30 would provide 10 scans every one thousandth of a second. This type scan rate has proven sufficiently fast to define the shape of transient mechanical motion of a pointer 14.

Since the pointer 14 rotates around shaft 32 it is necessary to modify the scan of the video camera means 16 to produce a circular scan. This can be achieved by having a first pair of electrostatic deflecting plates 34, see FIG. 3, located at right angles with a second pair of electrostatic deflecting plates 36. The scan signal from the oscillator 28 as modified by divider means 30 is fed through a filter 38 into the circulator sweep generator means 26. From the filter 38, the scan signal is simultaneously transmitted to a horizontal amplifier 40, vertical amplifier 42 and base reference switch 44. The scan signal transmitted to the horizontal amplifier 40 is 90° out of phase but equal in magnitude to that transmitted to the vertical amplifier 42 upon passing through a shifter 46. The scan signals being transmitted to the first and second deflecting plates 34 and 36 will be sinusoidal in shape and produce a circular trace 54, see FIG. 4, on the photo-sensitive target 48. The photo-sensitive target 48 is composed of a mosaic of many small capacitor elements whose individual leakage is controlled by the amount of light focused thereupon. The mosaic of capacitors 48 is charged by the scanning electron beam. The instantaneous current flowing in the connection common to all the capacitors in the mosaic, signal electrode 52, depends upon the amount of leakage in the particular elemental capacitor in the previous cycle of the scanning electron beam. Hence, an electrical signal is derived which is representative of the light intensity along the scanned path. The pointer 14 will appear as a constant width electrical impulse at signal electrode 52 as its image is transversed by the scanning electron beam. Since the indicia on the dial 20 could possibly be interpreted as the pointer position, the width of the pointer 14 is placed in the discriminator and only this width is recognized in producing a pulse signal. The pulse signal is transmitted into the counter means 24 where it is fed into and serves to stop counter 68, which was initially activated by a start signal from the reference switch 44. The intervening time interval between start and stop commands is measured by counting the output pulses $F_c$ of oscillator 28. A first delay 70 impedes the transmission of the pulse signal to a storage bank 72 until the signal representative of the time interval is relayed from the counter 68 to the storage bank 72. The delayed pulse signal will activate a latch which locks the time interval in the storage bank 72. A second delay 74 receives the delayed pulse signal from the first delay 70 and transfers a reset signal to the counter 68. Thus, the counter is reset to receive the signal generated in the next scan of the dial 20 by the camera means 16.

The signal representing the time interval in the storage bank 72 is converted into an output signal and relayed to a digital to analog converter 76 of an error analyzer means 80. The output signal from the converter 76 is relayed to a readout means (not shown) which will give the relationship of the pointer 14 with respect to a base (the ground elevation for an altimeter) as determined by the relationship of the lapsed time from activation of the counter 68 by the reference switch 44. During a set time period the signal from input source 12 should revolve the pointer 14 on the shaft to move sub dial 78 and indicate a total simulated elevation above sea level. The output signal will be transmitted through a capacitor 84 wherein a stop jump signal is determined by analyzing the duration of time interval with respect to an input from a master signal. As shown in FIG. 2, the angular input from the signal source 12 should produce a rotational output in the needle similar to line 82. If the output from the differentiator is equal to that developed from calibration of a master altimeter, the signal will be unity or $dv/dt = 1$. When $dv/dt < 1$, the input supplied has not produced a corresponding angular rotation of the pointer 14 indicating a stop-jump relationship as illustrated by line 86, FIG. 2. In this case, the differentiated signal will be negative (−) and will register on detector 88. If the intensity of the negative signal, which corresponds to the duration of the hesitation in rotation of the pointer 14, reaches a predetermined magnitude as set by limit line 85, latch means 90 will activate light 92. Light 92 will inform an operator that a correction is necessary before the altimeter under test will match the master altimeter. At the same time, the magnitude of the jump will be transmitted to the read out means.

In this type of stop-jump condition, as illustrated by line 89, FIG. 2, the magnitude exceeds the limit 85 and as a result, a feedback signal will interrupt the input from source 12 until a correction is applied to the test altimeter.

When $dv/dt > 1$, the input signal will rotate the pointer during some portion of the cycle more than at other times, as illustrated by line 94. The differentiated signal will be positive (+) and will register on detector 96. When the line 94 and differentiated signal exceeds limits 97, latch means 98 will activate light 100. The magnitude of the + differentiated signal will be recorded on the readout means. If a positive condition, as illustrated by line 102, is present, a feedback signal is relayed to interrupt the input from source 12 until corrective adjustments are performed on the altimeter 10 under test.

The output from the digital to analog converter 76 will have a saw-tooth shape as illustrated by line 104 in FIG. 5. This saw-toothed shape output signal is fed into a comparator 106 to be collated with a master output signal.

This master output signal is generated by modifying an input signal from source 12 in a stair-step generator 108 and an operational amplifier 110 which places this input signal in a saw toothed shape before being presented to the comparator 106. The output of the comparator 106 is relayed to a readout means where any variance between the master signal and the output signal of the altimeter under test is recorded.

At the same time an operator can make a visual comparison by observing the output of the comparator 106 on a screen 112 of an oscilloscope. The output from the comparator 106 will be a straight line similar to line 114 in FIG. 6 when the output signal derived from the test altimeter 10 is identical with the master output signal.

When a variance occurs between these two signals as representative of the total uniformity or static condition, the output displayed in the screen 112 of an oscilloscope can vary between limits 116 and 118 and remain within the 1 percent accuracy requirement. However, if the static error exceeds these limits, a feedback is relayed to interrupt the input signal from source 12 and an indicator light 120 or audio source is activated to indicate a possible reject.

MODE OF OPERATION OF THE PREFERRED EMBODIMENT

The operator will select the desired resolution by adjusting the position of the focusing lens 18 and selecting the correct divider ratio on divider means 30. The input from source 12 is simultaneously relayed to the altimeter 10 and the oscillator 28. The oscillator 28 starts the counter 68 and the sweep generator means 26 to begin the circular trace of gun 58 on the photo-sensitive target 48. Each interception of the radial deflection 54 and the pointer 14 are relayed through the video processor 60 to a counter means 24 where the time interval between the zero reference and each interception is measured and retained. These time intervals are then converted into an output signal in the analyzer means 80 to determine the uniformity of angular rotation of the pointer 14 with respect to a master altimeter.

If a variance exists between the output signals and a master signal, any detrimental effect upon the operation of the altimeter 10 will be identified and recorded. However, if the detrimental effect exceeds predetermined limits, the visual indicators 92, 100 and 120 will inform an operator that the altimeter should be rejected until a corrective adjustment is made on the altimeter 10.

Through the above described system I have devised a method of making several thousand measurements per second of the position of a pointer 14 of an altimeter 10 with a video camera whose circular scan is an integral sub-multiple of an oscillator clock frequency.

I claim:

1. A method of analyzing the angular displacement of a rotatable indicator with respect to an arcuate scale during a predetermined time period for estimating the accuracy of said indicator, comprising the steps of:
   applying a uniform input signal to rotate said indicator;
   scanning said indicator with a circular sweep generator having a selected resolution at a rate which uniformly divides the arcuate scale into segments;
   recording each interception of the indicator and a circular trace within said segments;
   counting the time period between a scan zero reference and each interception;
   converting each time interval into a corresponding output signal;
   comparing the output signal with a master signal derived by measuring the rotation of a master indicator in response to a sequential test signal to determine if the input signal will produce a corresponding uniform displacement of the rotatable indicator;
   detecting the duration and effect of any intermittent delay in the rotation of the rotatable indicator to determine if a stop-jump relationship exists between the input signal and the output signal;
   identifying any variance between the output signal and the master signal; and
   exhibiting said variance on a display to inform an operator a correction is required in said rotatable indicator.

2. The method of analyzing the rotatable indicator, as recited in claim 1, wherein said step of identifying the variance includes the step
   detecting the position of said rotatable indicator with respect to a base on said scale for determining the total arcuate distance traversed in response to the input signal during a sequence of time intervals.

3. The method of analyzing the rotatable indicator, as recited in claim 1, wherein said step of detection further includes the step of:
   inhibiting the transmission of the input signal to the rotatable indicator when a stop jump relationship suggests the accuracy of the rotatable indicator is below a predetermined limit and without a correction should be rejected.

4. The method of analyzing the rotatable indicator, as recited in claim 1, wherein said step of identifying the variance includes the step of:
   detecting the magnitude of any variance over a sequence of time intervals; and
   inhibiting the transmission of said input signal when said magnitude reaches a predetermined limit and without a correction a rejection should be made.

5. A system for comparing the accuracy of a test indicator with a master indicator comprising:
   input means connected to said test indicator for supplying a constant signal to cause a pointer in the indicator to rotate with respect to an arcuate scale therein:
   camera means for scanning the arcuate scale of the test indicator;
   generator means connected to said camera means for producing a circular trace which continually circumscribes the arcuate scale with a constant rate of angular resolution;
   processing means associated with said camera means for recording each interception of the circular trace and pointer;
   counter means connected to the processing means for determining the time interval between each interception;
   converter means connected to said counter means for transforming each of said time intervals into an output signal;
   analyzer means connected to said converter means for collating each output signal with a master signal to determine any variance therebetween which would produce an erroneous relationship between the pointer and scale in response to the input means;
   identifying means for determining the effect of any variance in the output signal and the master signal; and
   display means connected to the identifying means for informing an operator that a correction is required to match the output signal with the master signal.

6. The system of comparing the accuracy of a test indicator, as recited in claim 5, wherein said identifying means includes:
   additive means for summing the individual time intervals to determine the position of said pointer with respect to a base on said scale and to evaluate the response to the input means over a set period of time.

7. The system of comparing the accuracy of a test indicator, as recited in claim 6, wherein said identifying means further includes:
   detection means for measuring the duration and effect of any intermittent delay in rotation of the pointer to determine if a stop-jump relationship exists between the input signal and the pointer; and
   latching means for inhibiting the transmission of the input signal to the pointer if a stop-jump relationship above a predetermined limit is discovered.

8. The system of comparing the accuracy of a test indicator, as recited in claim 5, wherein said identifying means includes:
   additive means for summing the individual time intervals to determine the position of said pointer with respect to a base on said scale and to evaluate the response to the input means over a set period of time; and
   detection means for measuring the duration and effect of any intermittent delay in rotation of the pointer to determine if a stop-jump relationship exists between the input signal and the pointer.

9. The system of comparing the accuracy of a test indicator, as recited in claim 8 wherein said inhibiting means further includes:
   latching means for inhibiting the transmission of the input signal to the pointer if a stop-jump relationship above a predetermined limit is discovered.

* * * * *